United States Patent
Fussnegger et al.

(10) Patent No.: US 6,186,579 B1
(45) Date of Patent: Feb. 13, 2001

(54) BODY SECTION FOR A MOTOR VEHICLE BODY

(75) Inventors: Wolfgang Fussnegger, Tubingen; Volker Thoms, Calw-Hirsau, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/267,114

(22) Filed: Mar. 12, 1999

(30) Foreign Application Priority Data

Mar. 12, 1998 (DE) .............................................. 198 10 643

(51) Int. Cl.$^7$ ........................................................ B60J 1/08
(52) U.S. Cl. ................................... 296/146.1; 296/146.9; 296/146.5; 296/191
(58) Field of Search .............................. 296/146.1, 146.5, 296/146.9, 191; 49/502; 52/582.1

(56) References Cited

U.S. PATENT DOCUMENTS

| | | | |
|---|---|---|---|
| 4,196,929 | * | 4/1980 | Bauer ................................... 296/31 R |
| 4,888,919 | * | 12/1989 | Strosberg et al. ...................... 49/502 |
| 5,050,351 | * | 9/1991 | Goldbach et al. ..................... 49/502 |
| 5,446,999 | | 9/1995 | Inaba et al. ............................ 49/502 |
| 5,511,344 | * | 4/1996 | Dupuy .................................. 49/496.1 |
| 5,809,707 | * | 9/1998 | Bargados et al. .................. 52/204.62 |
| 5,830,559 | * | 11/1998 | Goldbach et al. .................... 428/192 |
| 5,987,821 | * | 11/1999 | Heim et al. ............................ 49/502 |

FOREIGN PATENT DOCUMENTS

| | | | |
|---|---|---|---|
| 3117-113 | * | 11/1982 | (DE) ................................... 296/146.9 |
| 3238-651 | * | 4/1984 | (DE) ...................................... 296/191 |
| 195 14 963 A1 | | 10/1996 | (DE) . |
| 0 424 760 A2 | | 5/1991 | (EP) . |
| 40-3258611 | * | 11/1982 | (JP) ....................................... 296/191 |

* cited by examiner

Primary Examiner—D. Glenn Dayoan
Assistant Examiner—Lori L. Coletta
(74) Attorney, Agent, or Firm—Evenson, McKweon, Edwards & Lenahan, P.L.L.C.

(57) ABSTRACT

A body shell part for a motor vehicle body having a profile edge that is form-lockingly embedded in an elastic edge profile. The elastic edge profile has an elastically bendable detent nose profile arrangement which is form-lockingly locked onto an adjacent circumferential edge of the structural vehicle body part. A detachable securing arrangement is assigned to the detent nose profile arrangement for blocking the elastically bendable detent nose profile arrangement in its operating position reaching over the circumferential edge of the structural vehicle body part.

26 Claims, 1 Drawing Sheet

BODY SECTION FOR A MOTOR VEHICLE BODY

BACKGROUND OF THE INVENTION

This application claims the priority of 198 10 643.2-42, filed Mar. 12, 1998, the disclosure of which is expressly incorporated by reference herein.

The present invention is directed to a body section for a motor vehicle body having an interior structural body part on which a body shell part is placed on the outside by way of an edge profile made of an elastically resilient material. The body shell part is provided with an inwardly bent profile edge which extends along the circumference of the body shell part.

Body sections for motor vehicle bodies in the form of a vehicle body side door, are known, for example, from U.S. Pat. No. 5,446,999. The vehicle body side door has an interior structural body part as well as a body shell part which is detachably connected with the interior structural body part. The connection between the body shell part and the structural body part takes place by means of an elastic edge profile which reaches over a surrounding J-shaped profile edge of the body shell part, on the one hand, and a circumferential edge of the structural body part, on the other hand. The elastic edge profile has an H-shaped cross-section.

German Patent Document DE 195 14 963 A1 discloses a motor vehicle door which has an exterior covering in the form of a door leaf as well as an interior-side covering. The door leaf and the interior covering are connected with one another by way of a bend-over provided on a bottom side on the door leaf. The circumferential edge of the interior covering engages in a form-locking manner in the bend-over of the door leaf. On the top side, an undercut is provided, in the case of which the wall facing away from the door leaf is constructed as a detent nose. This detent nose is snapped into a corresponding undercut of a basic body of the vehicle door having a corresponding detent nose. In addition, the upper edge of the basic body and the web-shaped extension of the door leaf are connected with one another by means of a metal clamp.

European Patent Document EP 0 424 760 A2 discloses another type of motor vehicle door which has a basic body provided with a detachable door leaf. The door leaf can be exchanged in a simple manner in that mutually corresponding edges of the basic body and of the door leaf have grooves that open toward one another, into which a viscoplastic profile strip is inserted which connects the edges with one another and compensates for thermal expansion differences.

It is an object of the invention to provide a vehicle body section of the initially mentioned type which permits a simple and secure fastening of the body shell part on the structural vehicle body part.

This and other objects are achieved by the present invention, wherein the profile edge of the body shell part is form-lockingly embedded in the elastic edge profile. The elastic edge profile has an elastically bendable detent nose profile arrangement which is form-lockingly locked onto an adjacent circumferential edge of the structural vehicle body part. A detachable securing arrangement is assigned to the detent nose profile arrangement for blocking the elastically bendable detent nose profile arrangement in its operating position reaching over the circumferential edge of the structural vehicle body part. Securing the body shell part on the structural vehicle body part by means of the securing arrangement prevents the body shell part from detaching again from the structural vehicle body part. In addition, the securing arrangement ensures a protection against theft and burglary, since, in the operating position of the edge profile, the body shell part cannot be pulled off toward the outside.

The solution according to the present invention also permits simple exchangeability of the body shell part. Also, the solution according to the invention ensures that the body shell part cannot be attached to the structural vehicle body part before corresponding paint coats on the two parts of the vehicle body section are completed. In addition, according to its function within the whole motor vehicle body, the structural vehicle body part can also already be fitted with corresponding operating assemblies which can easily be mounted from the outside. The mounting of the body shell part can then only take place subsequently, that is, after the completed assembly of the structural vehicle body part.

These advantages are achieved particularly when the vehicle body section is constructed as a vehicle side door or vehicle tail gate since, in the case of these components, a plurality of mechanical, electric, pneumatic and electronic structural elements must be housed in the structural vehicle body part of the vehicle side door or of the tail gate. The accommodation can be carried out much more easily from the exterior side than from the inside if the body shell were already in place.

The embedding of the profile edge in the elastic edge profile preferably takes place by surrounding the profile edge by means of the flexible material of the edge profile in the melted condition in a corresponding tool mold. In the same manner, the edge profile can, however, also be mounted on the profile edge of the body shell part in the finished condition. This can be carried out without high expenditures with a sufficient flexibility of the edge profile. The surrounding of the profile edge by means of the elastic edge profile in this embodiment also ensures a secure retention of the edge profile on the body shell part.

As a further embodiment of the invention, the edge profile has a sealing lip section which flanks the profile edge with respect to an adjacent vehicle body section. This closes off flush with an outer contour of the body shell part such that the sealing lip section fills in a gap between adjacent vehicle body sections. As a result, a reliable sealing of corresponding gaps is achieved. This further development is particularly advantageous when the vehicle body section is designed as a vehicle side door since the sealing lip section can then seal off the door joint.

In a further embodiment of the invention, the edge profile, for receiving the securing arrangement, has a plug-in groove adjoining the detent nose arrangement. The securing arrangement is designed as a corresponding plug-in profile which can be received in the plug-in groove in a force-locking manner. This is a particularly simple and functionally reliable further development, in which the plug-in profile may have a frame-shaped design and may be part of an interior covering.

In a further embodiment of the invention, the plug-in groove is provided on opposite sides with saw-tooth-type profilings. These profilings increase the force-locking connection between the plug-in profile and the edge profile in the operating position of the plug-in profile.

In yet a further embodiment of the invention, the elastic material of the edge profile has insulating characteristics. This results, in particular, in an uncoupling of sounds of the body shell part from the structural vehicle body parts.

In a further embodiment of the invention, the sealing lip section and the detent nose profile arrangement are designed as parts of the edge profile which are molded on in one piece.

This permits a particularly simple and low-cost manufacturing of the edge profile.

Other objects, advantages and novel features of the present invention will become apparent from the following detailed description of the invention when considered in conjunction with the accompanying drawings.

BRIEF DESCRIPTION OF THE DRAWINGS

Additional advantages and characteristics of the invention are found in the attached claims. In the following, a preferred embodiment of the invention will be described and illustrated by means of the drawings.

DETAILED DESCRIPTION OF THE DRAWINGS

Figure 1:
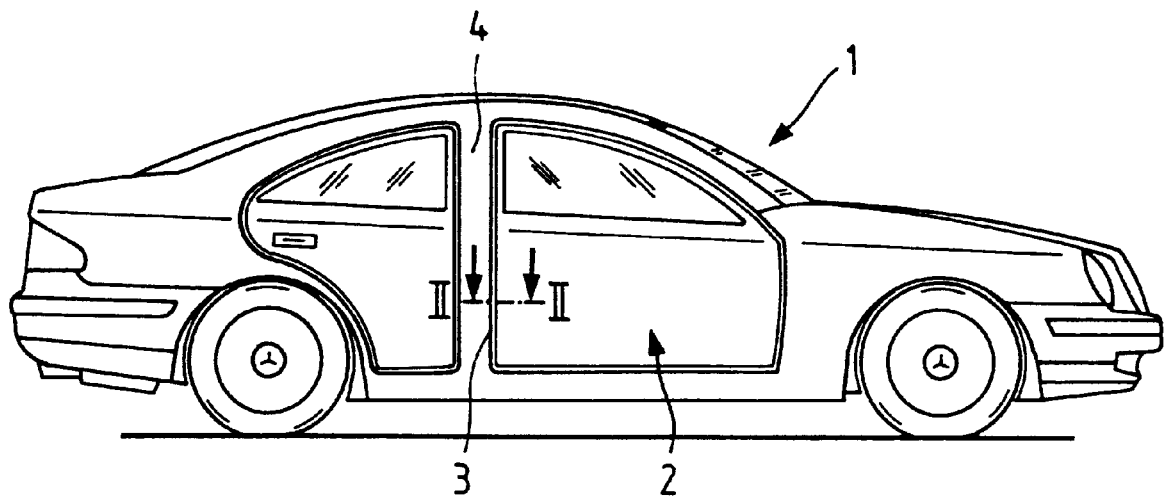
FIG. 1 is a schematic lateral view of a passenger car which is provided with an embodiment of a vehicle body section in the form of a vehicle side door according to the invention.

According to FIG. 1, a passenger car 1 has a self-supporting motor vehicle body having as a vehicle body section, two front-side vehicle side doors 2 on opposite sides, which have identical designs. Such a vehicle side door is swivellably disposed in a vehicle body opening. A B-column 4 adjoins the vehicle side door 2 in the longitudinal direction of the vehicle toward the rear and also forms a vehicle body section of the motor vehicle body. A door joint 3 remains between the vehicle side door 2 and the vehicle body section formed by corresponding vehicle body sections of the vehicle body.

Figure 2:
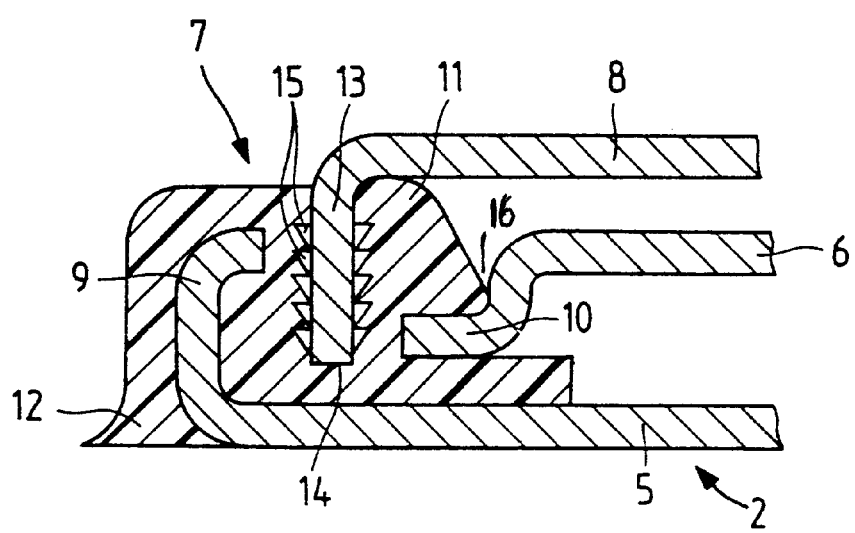
FIG. 2 is an enlarged sectional view of the vehicle side door along the intersection Line II—II in FIG. 1.

As illustrated in FIG. 2 the vehicle side door 2 has a structural vehicle body part 6 which serves as an interior part and in which various operating assemblies of the vehicle side door 2 are installed, such as the window pane, the window lift mechanism, the inside door handle, the door lock, the loudspeaker and similar devices. A body shell part 5 of the vehicle side door 2 is applied from the outside to the structural vehicle body part 6. For fastening the body shell part 5 on the structural vehicle body part 6, an edge profile 7 is provided which is produced in one piece from elastic plastic material. The edge profile 7 surrounds a C-shaped profile edge 9 of the body shell part 5 in a form-locking manner. Edge profile 7 extends in a surrounding fashion along the whole circumference of the body shell part 5. In one embodiment according to the invention, the profile edge is arranged to be distributed in sections, which are not shown, along the circumference of the body shell part.

The profile edge 9 is surrounded by the edge profile 7 such that the profile edge 9 is completely embedded in the edge profile 7. The C-shaped profile edge 9 is bent at a right angle toward the inside, its free end being again curved toward the inside at a right angle toward the structural vehicle body part 6. The profile section of the edge profile 7 surrounding the profile edge 9 has a sealing lip section 12 that closes off, in an aligned manner an outer contour of the body shell part 5. The exterior side of sealing lip section 12 is situated opposite the profile edge 9 and shaped such that the door joint 3 is completely filled by the sealing lip section 12 when the door is closed, thereby producing a seal. The sealing lip section 12 has two web-type lips which project to opposite sides and which, on one side, rest against the body shell part 5 and, on the other side, against the vehicle body opening.

In order to fix the body shell part 5 by means of the edge profile 7 on a circumferential edge 10 of the structural vehicle body part 6, circumferential edge 10 is bent into an S-shape and forms a surrounding receiving shoulder for a detent nose profile arrangement 11 of the edge profile 7. The circumferential edge 10 extends in a surrounding manner along the whole circumference of the structural vehicle body part 6 but, like the profile edge 9, may be interrupted in the same manner in sections. The edge profile 7, including its sealing lip section 12 as well as the detent nose profile arrangement 11, also extends in a surrounding manner along the whole circumferential length of the profile edges 9 and of the circumferential edge 10. Between the detent nose profile arrangement 11 and the profile section of the edge profile 7 embedding the profile edge 9, a surrounding plug-in groove 14 is provided, resulting in an elastic design of the detent nose profile arrangement 11.

The detent nose profile arrangement 11 has a stop bevel 16 by means of which the edge profile 7, including the body shell part 5, can be pressed in the transverse direction of the vehicle, that is, from the outside, onto the circumferential edge 10 of the structural vehicle body part 6. In this case, the detent nose profile arrangement is pressed toward the outside to the profile section surrounding the profile edge 9, whereby the stop bevel slides along the front edge of the circumferential edge 10. In the operating position, the detent nose profile arrangement 11 locks onto the circumferential edge 10 in that it reaches behind it. The detent nose profile arrangement 11 is preferably divided into several sections in the circumferential direction so that only straight-line sections of the detent nose profile arrangement are obtained which in a simple manner can implement the elastic bends toward the outside.

When the detent nose profile arrangement 11 is in the locked-on operation position on body shell part 5, to prevent it from being pulled off again toward the outside, a plug-in profile 8, which is used as a securing arrangement, is pressed by means of a corresponding plug section 13 into the plug-in groove 14. Plug-in profile 8 may have a frame-shaped design. The plug-in profile 8 may be part of an interior covering of the vehicle side door 3. The plug-in profile 8 is preferably made of aluminum. In order to achieve a secure retaining of the plug-in section 13 in the plug-in groove 14, the side walls of the plug-in groove 14 are provided with saw-tooth-type profilings 15. In the plugged-in condition of the plug-in profile 8, this plug-in profile 8 prevents a flexibility of the detent nose arrangement 11 so that the body shell part 5 cannot be detached from the structural vehicle body part 6. For detaching the body shell part 5 from the structural vehicle body part 6, the plug-in profile 8 is removed in a simple manner, whereby the body shell part 5 can then be pulled off toward the outside.

In the illustrated embodiment, the edge profile 7 is pulled onto the profile edge 9 after the completed painting of the body shell part 5, the edge profile 7 having a flexibility which is sufficient for such a pulling-on. The body shell part 5 is preferably painted together with the painting of the structural vehicle body part 6 as a separate component. The mounting of the body shell part 5 by means of the edge profile 7 takes place after the completion of the mounting of all operating assemblies on the structural vehicle body part 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Body section for a motor vehicle body having an interior structural body part on which a body shell part is mounted on the outside by way of an edge profile made of an elastically flexible material, the body shell part being provided with an inwardly bent profile edge which extends along the circumference of the body shell part, wherein the entirety of the inwardly bent profile edge of the body shell part is form-lockingly embedded in the elastic edge profile, further wherein the elastic edge profile has an elastically bendable detent nose profile arrangement which is form-lockingly locked onto an adjacent circumferential edge of the structural vehicle body part, and wherein a detachable securing arrangement is positioned in the detent nose profile arrangement thereby blocking the elastically bendable detent nose profile arrangement in its operating position extending around over the circumferential edge of the structural vehicle body part.

2. Body section according to claim 1, wherein the edge profile has a sealing lip section which flanks the profile edge, sealing lip section having a profile extending toward adjacent body sections and which closes off flush an outer contour of the body shell part such that the sealing lip section fills in a gap between the adjacent body sections.

3. Body section according to claim 1, wherein the edge profile, for receiving the securing arrangement, has a plug-in groove adjoining the detent nose profile arrangement, further wherein the securing arrangement comprises a corresponding plug-in profile which can be force-lockingly received in the plug-in groove.

4. Body section according to claim 3, wherein the plug-in groove is provided on opposite sides with saw-tooth-shaped profilings.

5. Body section according to claim 1, wherein the detent nose profile arrangement has a stop bevel which, when the edge profile is placed on the circumferential edge of the structural vehicle body part, presses the detent nose profile arrangement with an elastic bending necessarily to the side.

6. Body section according to claim 1, wherein the edge profile is detachably held on the circumferential edge of the structural vehicle body part.

7. Body section according to claim 1, wherein the edge profile comprises an elastic material having insulating properties.

8. Body section according to claim 1, wherein a sealing lip section and the detent nose profile arrangement are parts of the edge profile which are molded on in one piece.

9. Body section according to claim 2, wherein the edge profile, for receiving the securing arrangement, has a plug-in groove adjoining the detent nose profile arrangement, further wherein the securing arrangement comprises a corresponding plug-in profile which can be force-lockingly received in the plug-in groove.

10. Body section according to claim 2, wherein the edge profile is detachably held on the circumferential edge of the structural vehicle body part.

11. Body section according to claim 3, wherein the edge profile is detachably held on the circumferential edge of the structural vehicle body part.

12. Body section according to claim 4, wherein the edge profile is detachably held on the circumferential edge of the structural vehicle body part.

13. Body section according to claim 5, wherein the edge profile is detachably held on the circumferential edge of the structural vehicle body part.

14. Body section according to claim 2, wherein the edge profile comprises an elastic material having insulating properties.

15. Body section according to claim 3, wherein the edge profile comprises an elastic material having insulating properties.

16. Body section according to claim 4, wherein the edge profile comprises an elastic material having insulating properties.

17. Body section according to claim 5, wherein the edge profile comprises an elastic material having insulating properties.

18. Body section according to claim 6, wherein the edge profile comprises an elastic material having insulating properties.

19. Body section according to claim 2, wherein the sealing lip section and the detent nose profile arrangement are parts of the edge profile which are molded on in one piece.

20. Body section according to claim 3, wherein a sealing lip section and the detent nose profile arrangement are parts of the edge profile which are molded on in one piece.

21. Body section according to claim 4, wherein a sealing lip section and the detent nose profile arrangement are parts of the edge profile which are molded on in one piece.

22. Body section according to claim 5, wherein a sealing lip section and the detent nose profile arrangement are parts of the edge profile which are molded on in one piece.

23. Body section according to claim 6, wherein a sealing lip section and the detent nose profile arrangement are parts of the edge profile which are molded on in one piece.

24. Body section according to claim 7, wherein a sealing lip section and the detent nose profile arrangement are parts of the edge profile which are molded on in one piece.

25. A body section for a motor vehicle body comprising:

a body shell part having a C-shaped profile edge extending circumferentially around an exterior edge of the body shell part;

an interior structural body part having a S-shaped edge that extends circumferentially around the interior structural body part;

an elastic edge profile adapted to be secured to and entirely surround the C-shaped profile edge of the body shell part, the elastic edge profile further comprising a detent nose profile adapted to fit around a portion of the S-shaped edge of the interior structural body part; and a detachable securing device adapted to be fit into the detent nose profile thereby preventing detachment of the body shell part from the elastic edge profile and the interior structural body part.

26. A method for securing an exterior body shell part to an interior structure body part comprising;

forming a C-shaped profile edge circumferentially around an exterior edge of the body shell part;

forming an S-shaped edge circumferentially around the interior structural body part;

fitting an elastic edge profile entirely around the C-shaped profile edge of the body shell part;

pulling an elastic detent nose profile of the elastic edge profile onto a portion of the S-shaped edge of the interior structural body part; and inserting a detachable securing device into the detent nose profile in a position whereby the body shell part is prevented from detaching from the elastic edge profile the interior structural body part.

* * * * *